O. B. HANSON.
BELT CONVEYER TRIPPER.
APPLICATION FILED APR. 19, 1919.
1,429,732.
Patented Sept. 19, 1922.
3 SHEETS—SHEET 1.
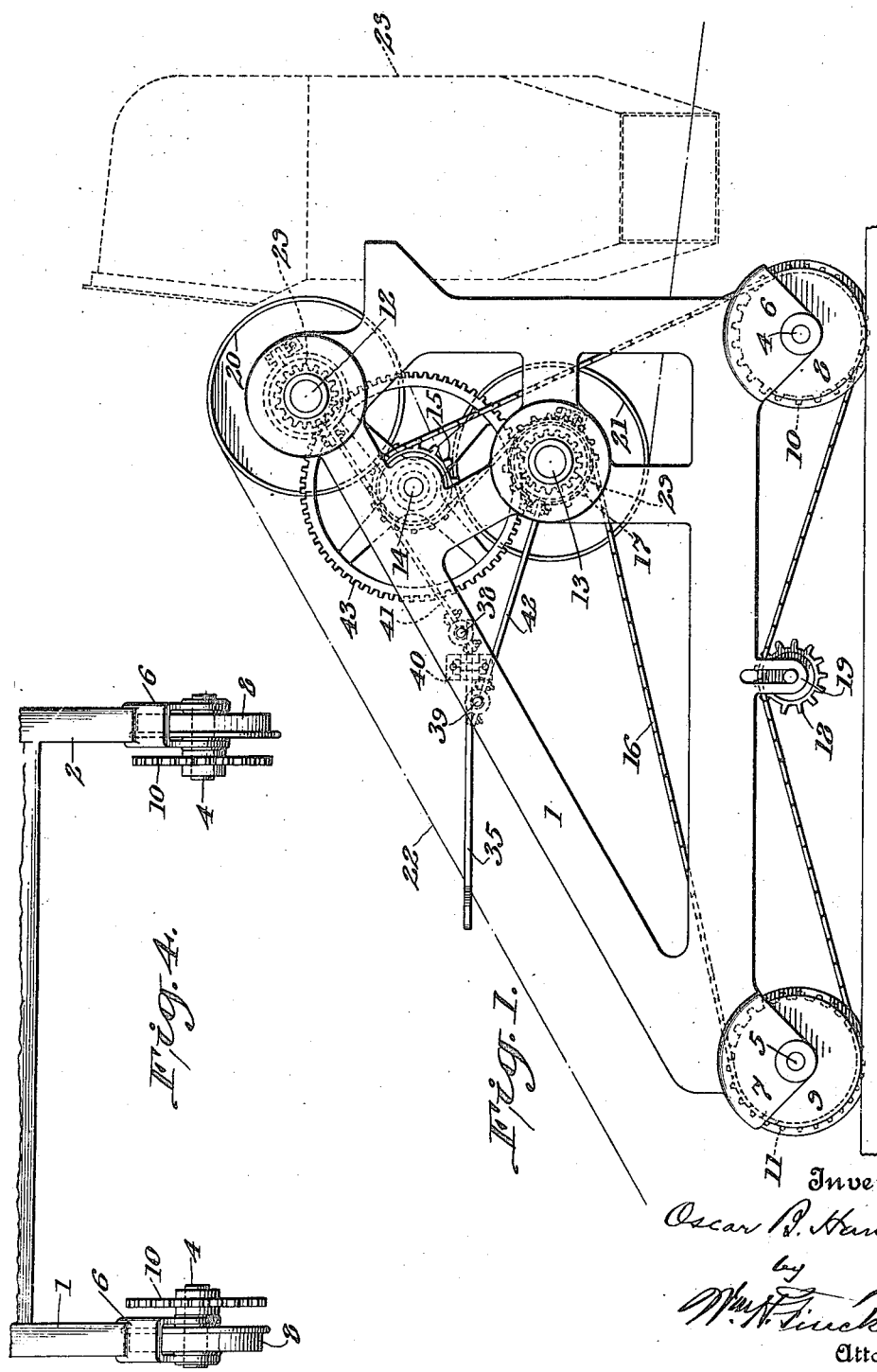
Inventor
Oscar B. Hanson
by
W. H. Finckel
Attorney O. B. HANSON.
BELT CONVEYER TRIPPER.
APPLICATION FILED APR. 19, 1919.
1,429,732.
Patented Sept. 19, 1922.
3 SHEETS—SHEET 2.
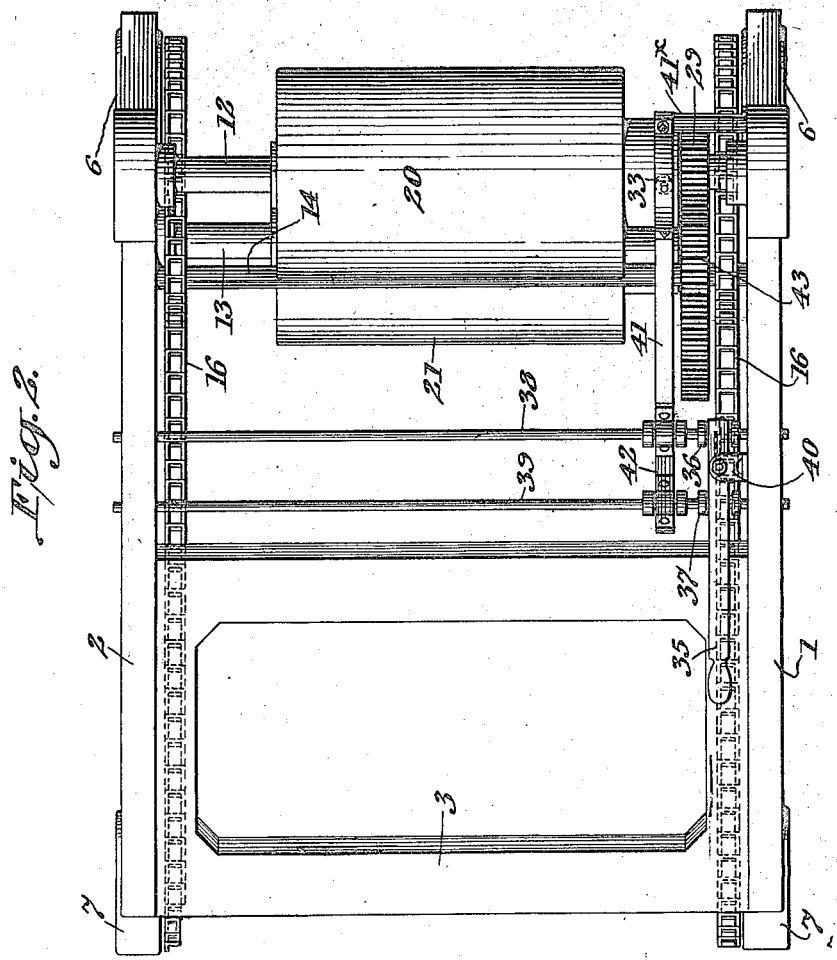
Inventor
Oscar B. Hanson
by
Attorney

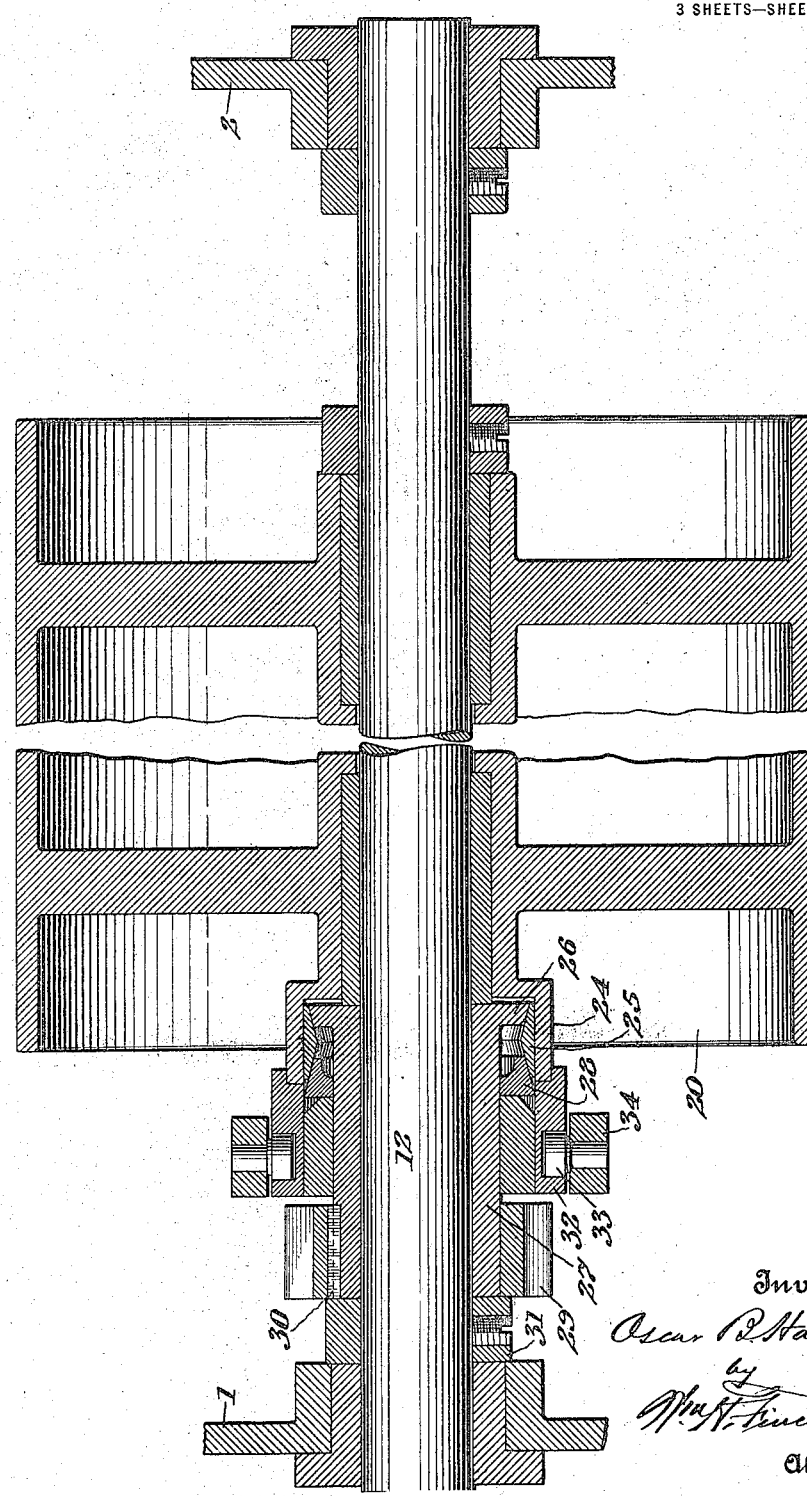

Patented Sept. 19, 1922.

1,429,732

UNITED STATES PATENT OFFICE.

OSCAR B. HANSON, OF TIFFIN, OHIO.

BELT-CONVEYER TRIPPER.

Application filed April 19, 1919. Serial No. 291,251.

*To all whom it may concern:*

Be it known that I, OSCAR B. HANSON, a citizen of the United States, residing at Tiffin, in the county of Seneca and State of Ohio, have invented a certain new and useful Improvement in Belt-Conveyer Trippers, of which the following is a full, clear, and exact description.

The object of this invention is to provide a tripper mechanism for continuous belt conveyers for unloading grain, ore, coal and other merchandise.

The invention consists of a traveling carriage having tripper pulleys idling on shafts and combined with a clutch mechanism and a carriage drive by which the carriage may be operated to run back and forth at the will of the operator, as I will proceed now to explain and finally claim.

In the accompanying drawings illustrating the invention, in the several figures of which like parts are similarly designated, Figure 1 is a side elevation showing one form of hopper or chute in dotted lines. Fig. 2 is a top plan view. Fig. 3 is a longitudinal section, on a larger scale, of the idling pulley, the two pulleys used being alike. Fig. 4 shows in elevation one pair of the drive wheels and their connection with the frame.

The carriage in accordance with the present illustration, comprises side frames 1 and 2, suitably connected in parallel relation, as by cross-pieces, such as 3. Axles 4 and 5 are arranged in housings 6, 6 and 7, 7 at opposite ends of the frames at their bottoms, and on these axles are fixed the traction wheels 8, 8 and 9, 9 and the sprocket wheels 10 and 11, respectively. Stationary shafts 12 and 13 are securely fastened or keyed in the side frames, and an intermediate rotary shaft 14 has bearings in said frames. On opposite ends of the shaft 14 are sprocket wheels 15 carrying drive chains 16 which engage the sprocket wheels 17 on shaft 13 and the sprocket wheels 10 and 11 on the axles 4 and 5, and the supporting sprocket wheels 18 located in slotted housings 19 arranged between the drive wheels on the side frames 1 and 2 and serving to hold up said chains.

Two like pulleys or drums 20 and 21 are arranged idle on the shafts 12 and 13, respectively, and these pulleys support the belt conveyer 22 which may be of any known or approved construction for moving grain, ore, coal and other merchandise or substances, to be discharged into the hopper or chute 23 also of known or approved construction, by which the goods conveyed by the belt are discharged as desired. As the pulleys 20 and 21 are alike, a description of one will suffice for both. As already stated, the pulleys run loose on their respective shafts, and each pulley has a housing 24 within which is a loosely arranged beveled ring 25 forming a clutch member which is adapted to be engaged by a beveled flange 26 on a clutch hub 27 and a beveled annular clutch member 28 sliding on the clutch hub 27, said clutch hub 27 being idle on the shaft of the pulley, and on this clutch hub is secured a pinion 29 as by means of a key 30, so that said pinion turns said hub and when the clutch is operated to force the ring 25 into frictional engagement with the housing 24 of the pulley, the pulley will turn with it. The clutch itself is not herein claimed, same being substantially like that shown in Hansen's Patent No. 1,338,298, dated April 27, 1920. A washer or collar 31 is interposed between the side frames and the pinion 29. The clutch ring 32 is grooved to receive the rollers 33 of the shifter ring 34, and this clutch ring is slidable on the clutch hub 27 toward and from the pulley to engage and release the pulley. A shifter lever 35 is pivotally mounted upon the side frames and is connected by collars 36 and 37 with sliding rods 38 and 39 mounted in the side frames, and these rods are consequently moved in opposite directions by the transverse movement of the shifter lever, inasmuch as said shifter lever has its pivotal support 40 arranged on the adjacent side frame between these rods. One of the rods engages a connecting lever 41 pivoted to a bracket 41× and engaging the clutch ring 32 on the upper pulley, and the other rod engages a connecting lever 42 similarly pivoted and engaging a similar clutch ring on the lower pulley, so that in the movement of the shifter lever, one pulley is adapted to be driven while the other pulley remains idle.

The pinions 29 of the pulleys mesh with an intermediate gear wheel 43 arranged to turn with the shaft 14 so that the drive chain 16 is driven in opposite directions as one or the other of the pulleys is driven, and hence the carriage may be run in opposite directions as desired.

It will be understood upon reference to the drawings that the conveyer belt supplies the motion to turn the pulleys and thereby cause the carriage to travel in one direction or the other in accordance with which one of the pulleys for the time being is engaged by the clutch to turn the gear wheel 43, the other pulley meanwhile running idle on its shaft.

Emphasis is laid on the stated fact that the pulleys run loose or idle on their respective shafts, and these shafts are securely fastened or keyed to the side frames, and that the clutches also operate loose on the shafts to be shifted as desired to engage one or the other of the pulleys in accordance with the direction of travel of the tripper that is desired. With this construction the tripper mechanism is greatly simplified, especially in comparison with those trippers in which the pulleys are keyed to the shafts and the shafts turn in journals or bearings in the side frames.

Various changes in details of construction are permissible within the spirit and scope of the invention as herein claimed.

What I claim is:—

1. In a belt conveyer tripper, a carriage having side frames, shafts fastened in said side frames stationarily, pulleys mounted idle on said shafts and adapted to be driven in opposite directions, a friction clutch for each pulley also idling on the same shafts and adapted to be shifted to engage one or the other of the pulleys, wheels on which said carriage is mounted, a pinion connected with the clutch mechanism of each pulley, an intermediate gear wheel meshing with said pinions, and means to transmit motion from the gear wheel to the carriage wheels to cause the tripper to run back and forth as desired in accordance with which pulley is clutched for the time being.

2. In a belt conveyer, a carriage mounted on drive wheels, a driving medium applied to said drive wheels, a drive shaft having a gear wheel, pulleys loosely mounted upon stationary shafts supported on the carriage, pinions applied to said pulleys and meshing with the gear wheel, clutches to render one or the other of said pinions operative to move the carriage in one or the other direction, and a conveyer belt passing over said pulleys on opposite sides thereof and serving to turn the pulleys to shift the carriage.

3. In a belt conveyer, a carriage mounted on drive wheels, a driving medium applied to said drive wheels, a drive shaft having a gear wheel, pulleys loosely mounted upon stationary shafts supported on the carriage, pinions indirectly applied to said pulleys and meshing with the gear wheel, clutches loosely mounted on said stationary shafts and adapted to operatively connect the pinions with the pulleys, a shifter lever, sliding rods with which the shifter lever is connected to move them in opposite directions, a connecting lever connecting one of the sliding rods with one of the clutches, and another connecting lever connecting the other sliding rod with the other clutch in alternation as the shifter lever is moved first one way and then the other to effect the reciprocating motion of the carriage.

In testimony whereof I have hereunto set my hand this 17th day of April A. D. 1919.

OSCAR B. HANSON.

Witnesses:
JOHN L. LOTT,
CLIFFORD O. HANSON.